July 25, 1939.  A. G. CARLSON  2,167,416

FEEDER FOR PULVERIZED MATERIALS

Filed July 21, 1937  2 Sheets-Sheet 1

Inventor:
Adolph G. Carlson

July 25, 1939.　　　A. G. CARLSON　　　2,167,416
FEEDER FOR PULVERIZED MATERIALS
Filed July 21, 1937　　　2 Sheets-Sheet 2
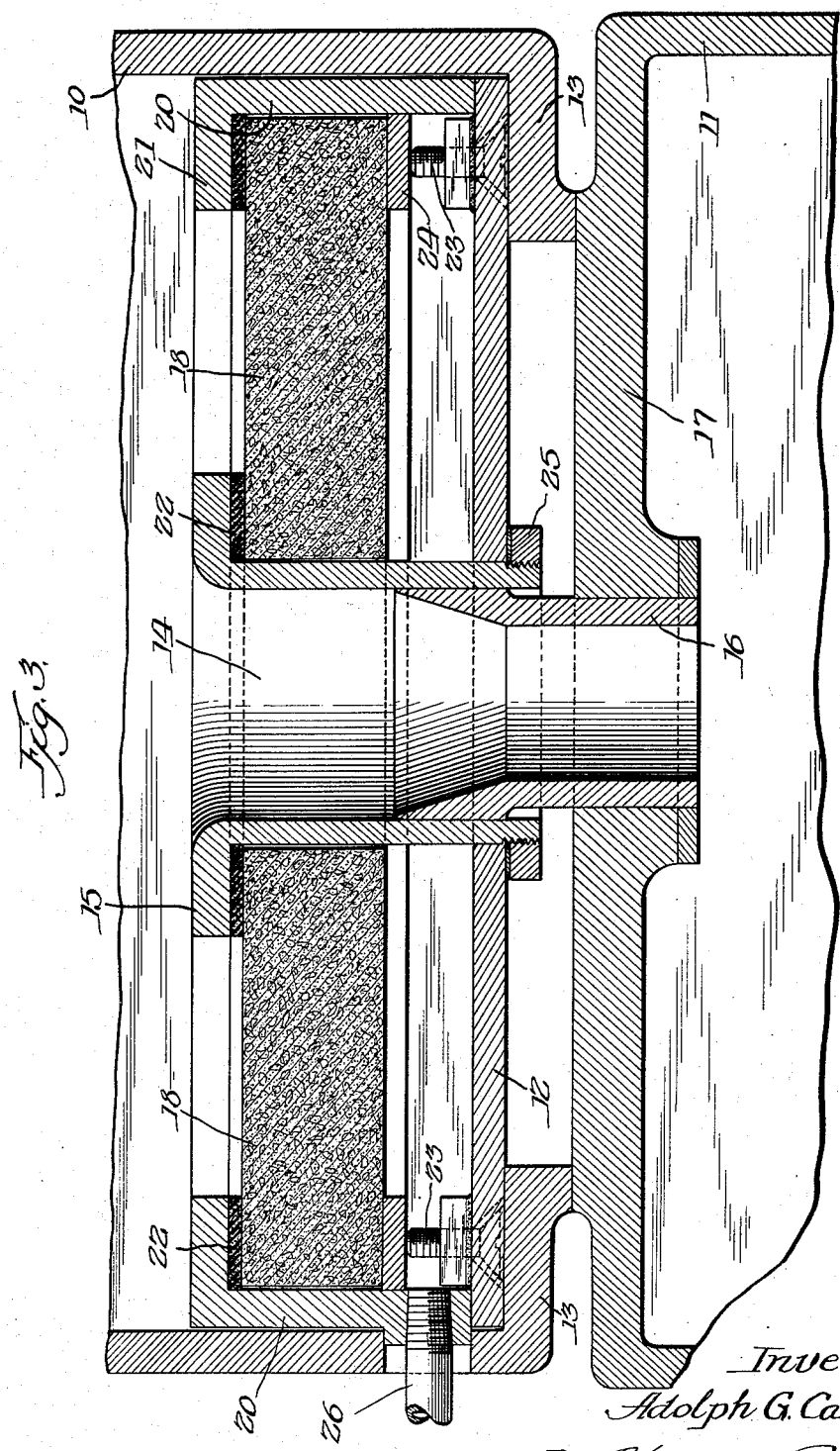
Inventor:
Adolph G. Carlson
By Usina & Rauber
Attys.

Patented July 25, 1939

2,167,416

UNITED STATES PATENT OFFICE 2,167,416

FEEDER FOR PULVERIZED MATERIALS

Adolph G. Carlson, Chicago, Ill.

Application July 21, 1937, Serial No. 154,883

2 Claims. (Cl. 221—124)

The invention relates to feeders particularly feeders for finely divided material such as cement and has for an object to provide novel apparatus which will feed a constant and uniform stream of material during the time the discharge port is open.

With these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

Figure 3 is an enlarged fragmentary sectional view illustrating the improvement of the invention.

Figure 1:
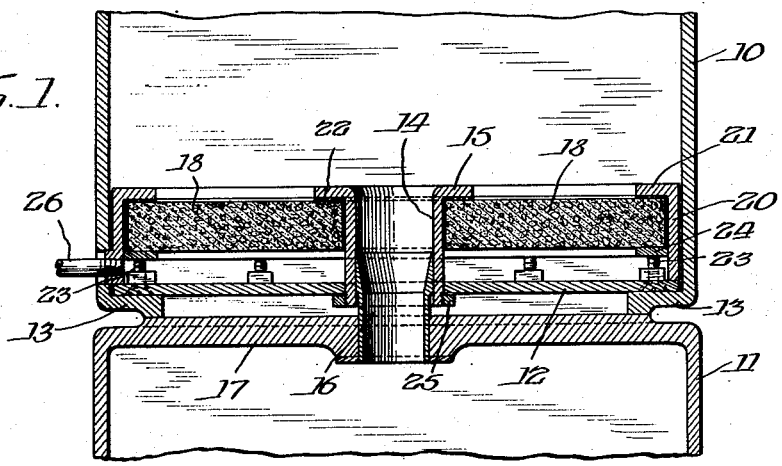
Figure 1 is a fragmentary sectional view of a feeder embodying the features of the invention.
Figure 2:
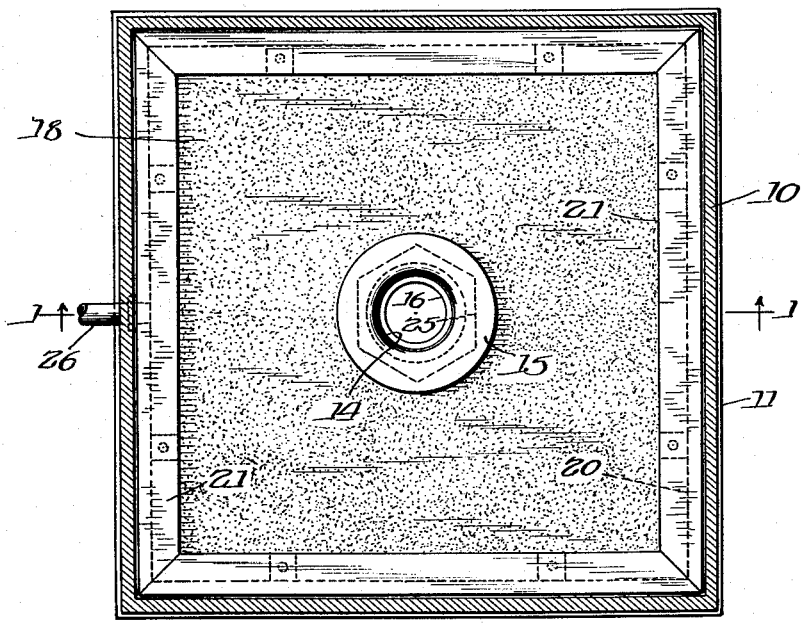
Figure 2 is a plan view of the feeder shown in Figure 1.

Referring to Figures 1 and 2, the invention is shown as applied to a receiving member 10 substantially square in plan, as shown in Figure 2, and which is supported by a base or foundation member 11 of substantially the same shape. It is to be understood that the invention is not limited to the particular receiving member shown, as cylindrical members or hoppers of conventional shape may be employed.

The receiving member is closed by a bottom plate 12 which rests upon the inwardly directed base flanges 13. The bottom plate is apertured for receiving the cylindrical member 14 having an outwardly directed flange 15 at the top thereof. The insert 16 which together with the cylindrical member 14 forms a discharge port for the receiving member extends through an opening in the top closure member 17 of the supporting base 11. The bottom of the receiving member 10 essentially consists of a porous block or member 18 which surrounds the discharge port 14, being held in place by the retaining member 20. Said member extends around the outer periphery of the porous block 18 and is provided with inwardly directed flanges 21 at the top thereof which overlie the marginal periphery of said block. In a similar manner the flanges 15 overlie the inner periphery of the said block. Between the block and the flanges 15 and 21 are rubber washers 22 interposed to prevent damage to the block which is held in firm contact with said rubber washers by the screws 23. Said screws threaded in the bottom plate 12 extend beyond said plate to engage the metal ring 24 interposed between the screws and the said block. Pressure is applied downwardly on the said block by the flanges 15 since the cylindrical member 14 is held to the bottom plate 12 by the ring 25 threaded to the end of said cylindrical member depending below the bottom plate.

The construction of the bottom of the hopper or receiving member as above described provides a perforated member which is retained in spaced relation with the bottom plate so that a pressure medium such as compressed air may be delivered below the said porous member and which thereby functions to discharge the air into the receiving member. Accordingly, the retaining member 20 has threaded thereto at one or more points throughout the periphery of said member an air supply pipe 26. Air under pressure is discharged by said pipes to the space below the porous block 18 which issues from said block into the receiving member in a direction upwardly to agitate the finely divided material in said member. Constant agitation of the material in the receiving member and particularly the material in the vicinity of the discharge port 15 functions to maintain a constant and uniform feed to said discharge port. The direction of the air discharged by the bottom of the receiving member, namely, the porous block 18, is upwardly and thus the material is prevented from settling and forming a compact mass on the bottom of the member. The discharge from the discharge port may be continuous or the discharge may be intermittent, as desired, but in all cases the supply of air under pressure to the porous block is continuous and accordingly the material within the receiving member is under constant agitation.

For the perforated bottom of the receiving member a porous block of substantial thickness is preferred. A block having a large number of relatively small openings will best diffuse the air passing therethrough. A Filtros block has been employed with very good results. This material is a rigid porous mineral substance composed essentially of silica and for purposes of general description is best termed an artificial porous stone.

The invention is not to be limited to or by details of construction of the particular embodiment thereof illustrated by the drawings, as various forms of the device will of course be apparent to those skilled in the art without departing from the spirit of the invention or the scope of the claims.

What is claimed is:

1. A feeder for finely divided material, in combination, a receiving member for receiving and retaining a quantity of said material, said receiving member having a bottom plate and a bottom member positioned in spaced relation above said plate, means having threaded connection with said plate and projecting above the inside surface thereof for spacing the bottom member, a tubular discharge port extending through said bottom member and plate, said discharge port having a laterally extending flange at its upper end overlying and having contact with the adjacent edges of said bottom member, the other end of said discharge port extending below the bottom plate and receiving securing means, and means delivering air under pressure to the space between the bottom member and plate, said bottom member having a plurality of relatively small perforations therein whereby the air is permitted to escape upwardly into the receiving member for agitating the material therein to maintain a constant and uniform feed to the discharge port.

2. A feeder for finely divided material, in combination, a receiving member for receiving and retaining a quantity of said material, said receiving member having a bottom plate and a bottom member positioned in spaced relation above said plate, means having threaded connection with said plate and projecting above the inside surface thereof for spacing the bottom member, a tubular discharge port extending through said bottom member and plate, said discharge port having a laterally extending flange at its upper end overlying and having contact with the adjacent edges of said bottom member, the other end of said discharge port extending below the bottom plate and receiving securing means, said bottom member comprising a porous block which thereby permits the escape of air upwardly into the receiving member for agitating the material therein to maintain a constant and uniform feed to said discharge port.

ADOLPH G. CARLSON.